US007369661B2

(12) United States Patent
Graunke

(10) Patent No.: US 7,369,661 B2
(45) Date of Patent: May 6, 2008

(54) METHOD AND APPARATUS FOR DETECTION OF LOSS OF CIPHER SYNCHRONIZATION

(75) Inventor: Gary L. Graunke, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 676 days.

(21) Appl. No.: 10/769,253

(22) Filed: Jan. 30, 2004

(65) Prior Publication Data

US 2005/0169466 A1 Aug. 4, 2005

(51) Int. Cl.
*H04L 9/00* (2006.01)
(52) U.S. Cl. ..................................... 380/260
(58) Field of Classification Search ................ 380/261, 380/204, 42, 260; 713/151, 178
See application file for complete search history.

(56) References Cited

U.S. PATENT DOCUMENTS

| | | | |
|---|---|---|---|
| 5,546,464 A * | 8/1996 | Raith et al. ............... | 380/272 |
| 6,944,299 B1 * | 9/2005 | Mallela et al. ............. | 380/262 |
| 7,110,546 B2 * | 9/2006 | Staring ....................... | 380/260 |
| 7,151,832 B1 * | 12/2006 | Fetkovich et al. .......... | 380/210 |
| 2003/0194087 A1 * | 10/2003 | Jansen et al. ............... | 380/265 |

OTHER PUBLICATIONS

An Analysis of the Statistical Self-Synchronization of Stream Ciphers, Howard M. Heys, 2001.*

* cited by examiner

*Primary Examiner*—Kambiz Zand
*Assistant Examiner*—Andrew L Nalven
(74) *Attorney, Agent, or Firm*—Michael R. Barre

(57) ABSTRACT

Detecting loss of stream cipher synchronization between a transmitter and a receiver in a video processing system may be achieved by receiving, by the receiver, an encrypted video frame from the transmitter, obtaining an encrypted value for a selected pixel in the encrypted video frame, decrypting the encrypted pixel value using a first portion of the receiver's current key stream, re-encrypting the pixel value using a second portion of the receiver's current key stream, sending the re-encrypted pixel value from the receiver to the transmitter, obtaining, by the transmitter, a plaintext value for the selected pixel from a corresponding original video frame and encrypting the plaintext pixel value using a second portion of the transmitter's current key stream, and comparing the re-encrypted pixel value received from the receiver with the encrypted pixel value generated by the transmitter and detecting a loss of cipher synchronization when the values do not match.

15 Claims, 2 Drawing Sheets

METHOD AND APPARATUS FOR DETECTION OF LOSS OF CIPHER SYNCHRONIZATION

BACKGROUND

1. Field

The present invention relates generally to computer security and, more specifically, to synchronization of cryptographic processing between two entities in a processing system.

2. Description

In some digital content transmission and reception systems, a transmitter sends digital content, such as audio/video data, over a fast, high bandwidth, unidirectional connection to a receiver, which renders the content for perception by a user. This connection often is noisy; that is, communication of data may include some errors in transmission. Some of these systems also have a slow, very low bandwidth back channel for communicating from the receiver to the transmitter.

In some of these systems, the transmitter encrypts the content prior to communication of the content to the receiver in order to protect the content from unauthorized access during transmission. The receiver then decrypts the received encrypted content and renders it. Systems typically employ a stream cipher for encryption and decryption of the content. When the content is audio/video data (such as a television program or film), each frame is typically encrypted with a unique key stream, and the transmitter and the receiver must continuously agree on the current position of the encrypted video stream being sent from the transmitter to the receiver. A sync pulse is typically sent at the transmission of a frame boundary of video data. When the transmitter and receiver get out of synchronization due to missing a sync pulse, as commonly occurs when the transmitter changes video sources (e.g., when the user changes TV channels and requests delivery of a different program) or when transmission errors occur, the receiver improperly decrypts the video data because it may be using a different key stream than the transmitter. The result may be display of a garbled video image called "video snow" for a period of time. The transmitter can abandon the out-of-sync video stream and initiate transmission of a new stream (in effect "re-synchronizing" the data flow), but will not do so until and unless the out-of-sync situation is detected.

One known solution to this problem includes checking every $128^{th}$ video frame of the video stream at the transmitter and receiver. However, this approach may still result in the display of "video snow" for up to four or five seconds in a worst case situation, depending on the frame rate being used. This result is undesirable from a viewer standpoint. Thus, new techniques are needed.

BRIEF DESCRIPTION OF THE DRAWINGS

The features and advantages of the present invention will become apparent from the following detailed description of the present invention in which.

DETAILED DESCRIPTION

An embodiment of the present invention is a method and apparatus for detecting when synchronization of cipher streams between a transmitter and a receiver in a video processing system have been lost. In embodiments of the present invention, at least one predetermined pixel in predetermined frames of the video stream received by the receiver may be re-encrypted by the receiver, using a part of a cipher stream not used in normal encryption/decryption processing, and sent back to the transmitter via a back channel. The transmitter may then decrypt the re-encrypted pixel received from the receiver and compare it with the corresponding plaintext pixel from the original content source. If they do not match, either the stream ciphers operating at the transmitter and receiver are out-of-sync with each other, or a data transmission error has occurred. In one embodiment, if the error is detected at least a predetermined number of times in a row, the transmitter can assert with high probability that the ciphers are out-of-sync and initiate creation of a new cipher key stream to regain synchronization.

Embodiments of the present invention allow for reliable detection of loss of synchronization between encrypting video devices (such as a set-top box, digital versatile disc (DVD) player, or a personal computer (PC), for example) and decrypting video devices. It helps prevent a bad user experience of lengthy video snow after channel changes or other video source changes, or from transmission errors. It also uses a minimal amount of bandwidth on the back channel for communicating results of error detection processing. Embodiments of the present invention may be useful for real-time environments where the bandwidth imbalance between the forward, main channel (from transmitter to receiver) and the auxiliary, back channel (from receiver to transmitter) is extreme and where temporary, limited data loss may be acceptable to a user.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
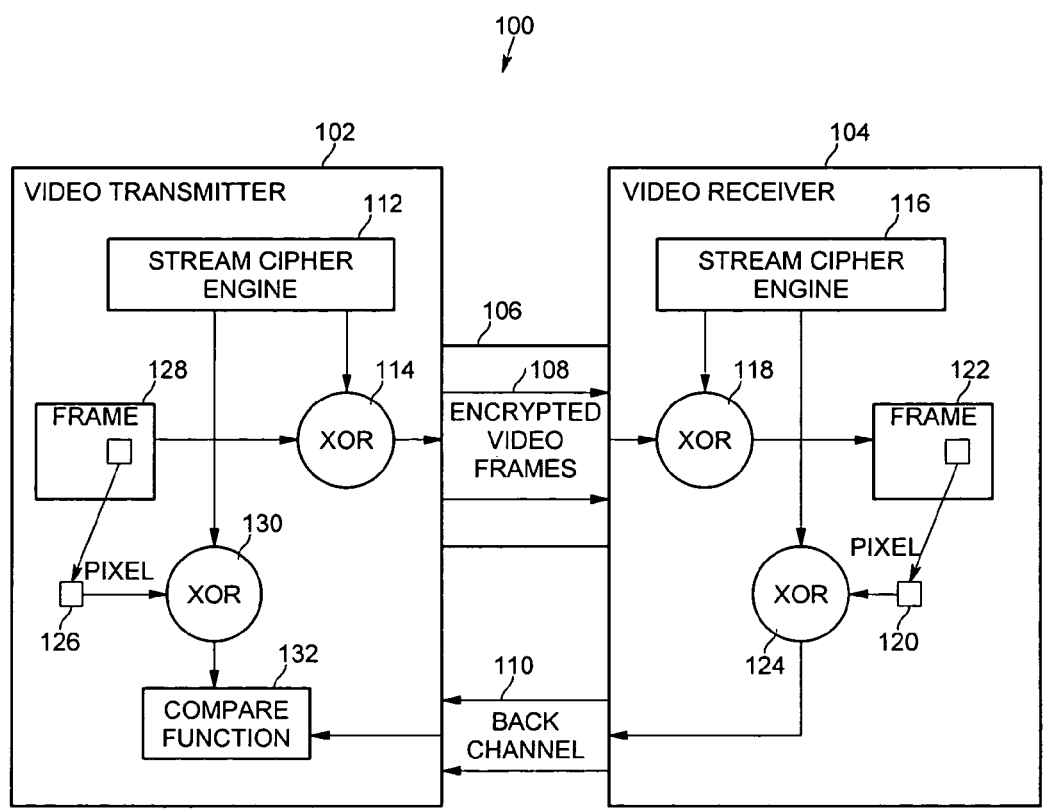
FIG. 1 is a diagram illustrating a video processing system according to an embodiment of the present invention.

FIG. 1 is a diagram illustrating a video processing system 100 according to an embodiment of the present invention. A video transmitter 102 sends data to a video receiver 104. Video transmitter 102 may comprise a satellite television (TV) set-top box, a cable TV set-top box, a digital versatile disk (DVD) player, a personal computer (PC), or any other consumer electronics video devices for transmitting audio/video data. The transmitter sends the data over a unidirectional, forward transmission link 106 to the receiver. The transmission link may be any wired or wireless data communications mechanism. In one embodiment, data sent on the transmission link may be protected according to the High-bandwidth Digital Content Protection (HDCP) protocol specified by Digital Content Protection, LLP and as defined at HDCP 1.1 Specification published Jun. 9, 2003 and available at www.digital-cp.com. In at least some embodiments, the data comprises encrypted video frames 108 representing high value content (e.g., a film, a TV program, and so on). This protects the content from being accessed in an unauthorized manner during transmission of the content from the transmitter to the receiver. The receiver 104 may decrypt the encrypted video frames 108 as they are being received and display the content to one or more viewers on a display monitor such as a TV, a computer display, a handheld display, or other display technology or device (not shown in FIG. 1) either coupled to or integral with the receiver. The video processing system also includes a relatively slow, low bandwidth back channel 110 for communicating information from the receiver to the transmitter.

The transmitter 102 may use a stream cipher engine 112 to accept digital content (not shown) and encrypt the content for transmission to the receiver. The stream cipher engine uses any suitable stream cipher to encrypt each frame (or in some cases, each portion of a frame such as a line) of video data by performing an exclusive-OR (XOR) operation 114 with a first portion of the transmitter's current key stream and the frame as is well known in the art. The result of the XOR operation 114 over successive video frames comprises encrypted video frames 108. The receiver 104 receives the encrypted video frames and decrypts them using a corresponding stream cipher engine 116. Stream cipher engine 116 performs an XOR operation 118 on the encrypted video frames using a corresponding first portion of the receiver's current key stream. The result comprises data to be rendered on a display for a viewer. In one embodiment, the key stream may be different for each frame of video data, and the transmitter and receiver must use the same key stream for that frame to properly encrypt, transmit, and decrypt the frame. In another embodiment, a different key stream may be used for each line of each frame of video data.

In at least one embodiment of the present invention, prior to decrypting the entire current frame received in the video stream from the transmitter, receiver 104 obtains the value of a predetermined pixel (not shown) from a frame 122 of the encrypted video frames. The stream cipher engine 116 of receiver decrypts the pixel's value using the first portion of the receiver's current key stream and XOR operation 118 to produce a plaintext pixel value 120. The stream cipher engine then re-encrypts this plaintext pixel using a second portion of the receiver's current key stream (the second portion not being used as part of the normal video frame encryption/decryption operations) and XOR operation 124. The receiver sends the re-encrypted pixel data over back channel 110 to the transmitter. In another embodiment, the decryption, re-encryption, and sending of the re-encrypted pixel may be performed concurrently with, or after decryption of the entire current video frame.

The transmitter receives the re-encrypted pixel data for the frame over the back channel. Since the transmitter knows which frame has been sent in the video stream to the receiver, the transmitter may obtain the value of the predetermined pixel 126 from frame 128 from the original plaintext content and encrypt the pixel's value using the second portion of the transmitter's current key stream and XOR operation 130. The transmitter may then use a compare function 132 to compare the re-encrypted pixel data received from the receiver (not shown) with the encrypted pixel data produced by XOR operation 130. If the values match, then there has been no error in transmitting the pixel. That is, the predetermined pixel has been successfully encrypted by the transmitter, sent to the receiver, and decrypted by the receiver using the correct key stream. This has been verified by the transmitter using the compare function. In one embodiment, if there is no error in handling the pixel, it may be presumed that there has been no error in handling the entire frame.

If, however, the pixel values do not match, the transmitter and receiver are either out-of-sync with respect to the key streams being used, or a data transmission error has occurred. In one embodiment, a new key stream may then be initiated (i.e., new stream cipher synchronization) and the frame resent in response to the error. In another embodiment, multiple consecutive errors may be detected prior to initiating re-starting of the key streams.

This process may be repeated for a predetermined pixel in every frame in the video stream or for every N frames of the video stream (where N>1) without departing from the scope of the invention.

Several alternatives are envisioned for various embodiments of the present invention. In one embodiment, both the receiver and the transmitter may re-encrypt the plaintext pixel value and each sends their computed value to a third entity, such as a software driver. The third entity then compares the two computed values and causes the initiation of stream cipher re-initialization as appropriate. In another embodiment, the pixel to check may be individually selected for each frame according to a predetermined criteria or algorithm known to both the transmitter and receiver (that is, in one embodiment, the pixel being selected may change from frame to frame). In another embodiment, the pixel value may comprise three components (e.g., red, green, and blue), each component value comprising one byte of eight bits, and any combination of one or more of the bytes for the pixel may be used in the comparison. Alternatively, more than one pixel per frame may be checked, or any predetermined set of pixels per frame may be checked.

In yet another embodiment, the pixel value checked by the receiver may be sent back to the transmitter or a third entity in the clear (i.e., not re-encrypted). In this case, the transmitter would not encrypt the predetermined pixel prior to the comparison function being performed. In still another embodiment, the transmitter may decrypt the received re-encrypted pixel value (in one embodiment using XOR operation 130) and compare this result to the original plaintext pixel using compare function 132 to detect the error.

Figure 2:
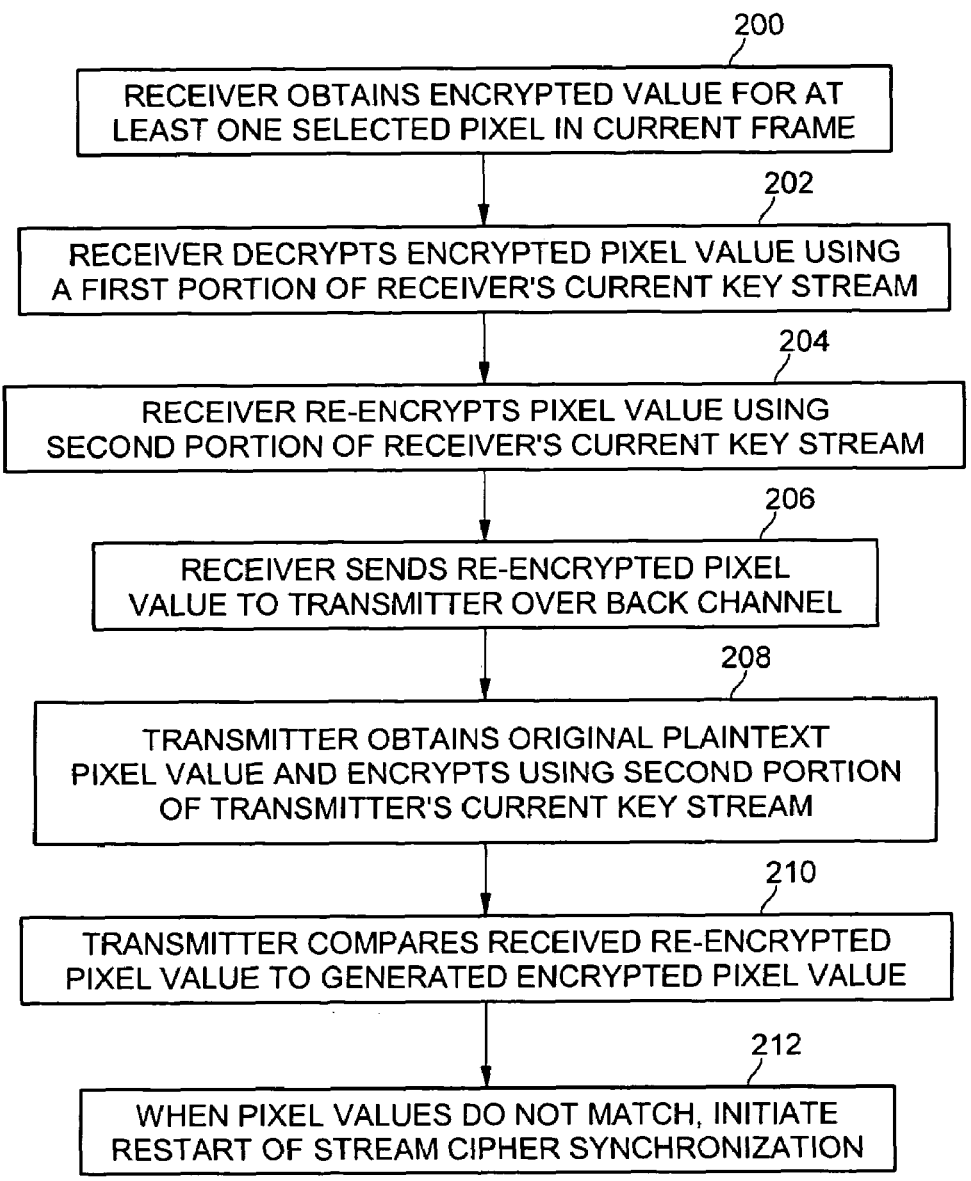
FIG. 2 is a flow diagram illustrating detection of loss of cipher synchronization processing according to an embodiment of the present invention.

FIG. 2 is a flow diagram illustrating detection of loss of cipher synchronization processing according to an embodiment of the present invention. The transmitter is assumed to be sending a stream of encrypted video frames to the receiver purportedly in synchronization with the receiver processing the received frames, and the key streams used by the stream cipher engines of the transmitter and receiver should be, but may not be, in sync. At block 200, the receiver obtains an encrypted value for at least one selected pixel in the current frame being received from the transmitter. At block 202, the receiver decrypts the encrypted pixel value using a first portion of the receiver's current key stream. The receiver then re-encrypts, at block 204, the now plaintext pixel value using a second portion of the receiver's current key stream, and sends the re-encrypted pixel to the transmitter over the back channel at block 206. In another embodiment, block 204 may be omitted, and the receiver may send the plaintext pixel back to the transmitter without re-encrypting the pixel.

At block 208, the transmitter obtains the original plaintext value for the selected pixel of the current frame (i.e., an original frame corresponding to the frame being processed by the receiver) and encrypts it using the second portion of the transmitter's current key stream (for those embodiments where the receiver did in fact re-encrypt the predetermined pixel). At block 210, the transmitter compares the re-encrypted pixel value received from the receiver with the corresponding encrypted pixel value generated by the transmitter. When the pixel values do not match at block 212, a restart of the stream cipher synchronization may be initiated.

If the plaintext pixel value was sent by the receiver, the transmitter need not encrypt the corresponding original pixel value from the content. Instead, a comparison of the plaintext pixel values may be directly made.

Embodiments of the present invention provide a significant improvement in detection of loss of cipher synchronization over the prior art. In one known prior art system, the sync check is performed only once for every 128 video frames. This is a relatively slow process and does not detect many errors. For example, 127 out of 128 times the transmitter and receiver may be off by one frame, but would not be detected. This provides a bad user experience because the sync error may result in up to five seconds of video snow on the display. In marked contrast, embodiments of the present invention detect errors off by only one frame, and the processing is much quicker. The timing constraints are relaxed, and the transmitter will detect the error as soon as possible, even if it is polling arbitrarily slow. No real-time operating system is required, and the detection is very reliable. Hence, the bandwidth used on the back channel is greatly reduced; the sync checking may be performed once between selected check pixels, as opposed to the frequent polling required to catch them when they are different in the prior art system. The bandwidth used in the present invention is minimal for the amount of time that undetected synchronization loss (e.g., video snow) is acceptable.

Embodiments of the present invention work even if the plaintext data (e.g., the video frame) is constant, such as a black video border.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features were omitted or simplified in order not to obscure the present invention.

Although the operations describe herein may be described as a sequential process, some of the operations may in fact be performed in parallel or concurrently. In addition, in some embodiments the order of the operations may be rearranged without departing from the spirit of the invention.

The techniques described herein are not limited to any particular hardware or software configuration; they may find applicability in any computing or processing environment. The techniques may be implemented in programs executing on programmable machines such as mobile or stationary computers, personal digital assistants, set top boxes, cellular telephones and pagers, consumer electronics devices, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method of detecting loss of stream cipher synchronization between a transmitter and a receiver in a video processing system comprising:

receiving, by the receiver, an encrypted video frame from the transmitter;

obtaining an encrypted value for a selected pixel in the encrypted video frame;

decrypting the encrypted pixel value using a first portion of the receiver's current key stream;

re-encrypting the pixel value using a second portion of the receiver's current key stream;

sending the re-encrypted pixel value from the receiver to the transmitter;

obtaining, by the transmitter, a plaintext value for the selected pixel from a corresponding original video frame and encrypting the plaintext pixel value using a second portion of the transmitter's current key stream; and comparing the re-encrypted pixel value received from the receiver with the encrypted pixel value generated by the transmitter and detecting a loss of cipher synchronization when the values do not match.

2. The method of claim 1, further comprising initiating a restart of the stream cipher synchronization when the loss is detected.

3. The method of claim 1, further comprising repeating the detection of loss of stream cipher synchronization for every frame in a stream of video frames.

4. The method of claim 3, further comprising selecting different pixels in each successive frame of the video stream.

5. The method of claim 1, wherein the comparing step is performed by an entity other than the transmitter and the receiver.

6. The method of claim 1, wherein the re-encrypted pixel value is sent from the receiver to the transmitter over a back channel.

7. The method of claim 1, wherein obtaining the encrypted value of the selected pixel and decrypting the encrypted pixel value are performed prior to decrypting the encrypted video frame.

8. An article comprising: a tangible machine readable storage medium storing instructions, that when executed by a processing system detect loss of stream cipher synchronization between a transmitter and a receiver in a video processing system by receiving, by the receiver, an encrypted video frame from the transmitter, obtaining an encrypted value for a selected pixel in the encrypted video frame, decrypting the encrypted pixel value using a first portion of the receiver's current key stream, re-encrypting the pixel value using a second portion of the receiver's current key stream, sending the re-encrypted pixel value from the receiver to the transmitter, obtaining, by the transmitter, a plaintext value for the selected pixel from a corresponding original video frame and encrypting the plaintext pixel value using a second portion of the transmitter's current key stream, and comparing the re-encrypted pixel value received from the receiver with the encrypted pixel value generated by the transmitter and detecting a loss of cipher synchronization when the values do not match.

9. The article of claim 8, further comprising instructions for initiating a restart of the stream cipher synchronization when the loss is detected.

10. A method of detecting loss of stream cipher synchronization between a transmitter and a receiver in a video processing system comprising:
  receiving, by the receiver, an encrypted video frame from the transmitter;
  obtaining an encrypted value for a selected pixel in the encrypted video frame;
  decrypting the encrypted pixel value using a first portion of the receiver's current key stream;
  re-encrypting the pixel value using a second portion of the receiver's current key stream;
  sending the re-encrypted pixel value from the receiver to the transmitter;
  obtaining, by the transmitter, a plaintext value for the selected pixel from a corresponding original video frame and decrypting the received re-encrypted pixel value using a second portion of the transmitter's current key stream; and
  comparing the decrypted pixel value received from the receiver with the plaintext pixel value obtained by the transmitter and detecting a loss of cipher synchronization when the values do not match.

11. An article comprising: a tangible machine readable storage medium storing instructions, that when executed by a processing system detect loss of stream cipher synchronization between a transmitter and a receiver in a video processing system by receiving, by the receiver, an encrypted video frame from the transmitter, obtaining an encrypted value for a selected pixel in the encrypted video frame, decrypting the encrypted pixel value using a first portion of the receiver's current key stream, re-encrypting the pixel value using a second portion of the receiver's current key stream, sending the re-encrypted pixel value from the receiver to the transmitter, obtaining, by the transmitter, a plaintext value for the selected pixel from a corresponding original video frame and decrypting the received re-encrypted pixel value using a second portion of the transmitter's current key stream, and comparing the decrypted pixel value received from the receiver with the plaintext pixel value obtained by the transmitter and detecting a loss of cipher synchronization when the values do not match.

12. A video processing system comprising:
  a transmitter adapted to encrypt video frames and to send a stream of encrypted video frames, wherein the transmitter comprises a first hardware component; and
  a receiver adapted to receive the stream of encrypted video frames from the transmitter, to obtain an encrypted value for a selected pixel in a selected encrypted video frames, to decrypt the encrypted pixel value using a first portion of the receiver's current key stream, to re-encrypt the pixel value using a second portion of the receiver's current key stream, and to send the re-encrypted pixel value from the receiver to the transmitter, wherein the receiver comprises a second hardware component;
  wherein the transmitter is further adapted to obtain a plaintext value for the selected pixel from a corresponding original video frame, to encrypt the plaintext pixel value using a second portion of the transmitter's current key stream, to compare the re-encrypted pixel value received from the receiver with the encrypted pixel value generated by the transmitter, and to detect a loss of cipher synchronization when the values do not match.

13. The video processing system of claim 12, further comprising a forward transmission link for sending the stream of encrypted video frames from the transmitter to the receiver and a back channel for sending the re-encrypted pixel value from the receiver to the transmitter.

14. The video processing system of claim 12, wherein the transmitter and receiver each comprise a stream cipher engine for performing encryption and decryption operations.

15. The video processing system of claim 12, wherein the transmitter comprises a compare function to compare the re-encrypted pixel value received from the receiver with the encrypted pixel value generated by the transmitter, and to detect a loss of cipher synchronization when the values do not match.

* * * * *